(12) United States Patent
Scheede et al.

(10) Patent No.: US 12,703,278 B2
(45) Date of Patent: Aug. 11, 2026

(54) ADJUSTMENT SYSTEM FOR A VEHICLE SEAT

(71) Applicant: BROSE FAHRZEUGTEILE SE & CO. KOMMANDITGESELLSCHAFT, COBURG, Coburg (DE)

(72) Inventors: Rene Scheede, Bamberg (DE); Jochen Hofmann, Marktgraitz (DE)

(73) Assignee: BROSE FAHRZEUGTEILE SE & CO. KOMMANDITGESELLSCHAFT, COBURG, Coburg (DE)

( * ) Notice: Subject to any disclaimer, the term of this patent is extended or adjusted under 35 U.S.C. 154(b) by 237 days.

(21) Appl. No.: 18/549,822

(22) PCT Filed: Mar. 7, 2022

(86) PCT No.: PCT/EP2022/055663
§ 371 (c)(1),
(2) Date: Sep. 8, 2023

(87) PCT Pub. No.: WO2022/189319
PCT Pub. Date: Sep. 15, 2022

(65) Prior Publication Data

US 2024/0157861 A1 May 16, 2024

(30) Foreign Application Priority Data

Mar. 9, 2021 (DE) ..................... 10 2021 202 283.9

(51) Int. Cl.
*B60N 2/427* (2006.01)
*B60N 2/18* (2006.01)

(52) U.S. Cl.
CPC ......... *B60N 2/4279* (2013.01); *B60N 2/1821* (2013.01); *B60N 2/1871* (2013.01); *B60N 2/42736* (2013.01)

(58) Field of Classification Search
CPC .............. B60N 2/4279; B60N 2/42772; B60N 2/42718; B60N 2/42763; B60N 2/1821; B60N 2/1871; B60N 2/0825
See application file for complete search history.

(56) References Cited

U.S. PATENT DOCUMENTS 7,517,019 B2 * 4/2009 Ohtsubo .............. B60N 2/1842 297/341
8,061,770 B2 * 11/2011 Houston .............. B60N 2/0244 297/216.19

(Continued)

FOREIGN PATENT DOCUMENTS

CN 110588455 A * 12/2019 ......... B60N 2/42772
CN 111746361 A 10/2020

(Continued)

OTHER PUBLICATIONS

China National Intellectual Property Administration, Office Action and Search Report Issued in Application No. 202280020088.6, Dec. 31, 2025, 12 pages. (Submitted with Partial Translation).

*Primary Examiner* — Timothy J Brindley
(74) *Attorney, Agent, or Firm* — McCoy Russell LLP

(57) ABSTRACT

It is provided adjustment system for a vehicle seat, which comprises a base, a lever, which is pivotably mounted on the base, and an adjustment unit, which is coupled to the lever and is configured to pivot the lever relative to the base. A release device coupled to the adjustment unit is provided, which release device is configured to cause a relative movement between the adjustment unit and the base on the (Continued)

basis of a signal indicating a vehicle collision from a collision sensor operatively connected or connectable to the release device.

15 Claims, 3 Drawing Sheets

(56) References Cited

U.S. PATENT DOCUMENTS

| | | | | |
|---|---|---|---|---|
| 9,358,904 | B1 * | 6/2016 | Muto | B60N 2/0825 |
| 11,364,825 | B2 * | 6/2022 | Huf | B60N 2/20 |
| 11,760,232 | B2 * | 9/2023 | Piotrowski | B60N 2/0276 297/216.12 |
| 2009/0160228 | A1 | 6/2009 | Houston et al. | |
| 2019/0308527 | A1 | 10/2019 | Nakamura et al. | |
| 2021/0114493 | A1 | 4/2021 | Huf et al. | |
| 2022/0305965 | A1 * | 9/2022 | Lücke | B60N 2/02246 |
| 2023/0141294 | A1 * | 5/2023 | Zuo | B60N 2/1821 296/65.05 |
| 2023/0158925 | A1 | 5/2023 | Zuo et al. | |
| 2025/0065780 | A1 * | 2/2025 | Kimura | B60N 2/02258 |
| 2025/0115174 | A1 * | 4/2025 | Chen | B60N 2/1842 |

FOREIGN PATENT DOCUMENTS

| | | | | | |
|---|---|---|---|---|---|
| CN | 111836741 | A | | 10/2020 | |
| DE | 19914163 | A1 | | 10/2000 | |
| DE | 10135857 | C1 | | 11/2002 | |
| DE | 10011819 | B4 | * | 5/2005 | B60N 2/4221 |
| DE | 102008045998 | A1 | | 6/2009 | |
| DE | 102018204461 | A1 | * | 10/2018 | B60N 2/42763 |
| DE | 102019132911 | A1 | | 6/2020 | |
| FR | 2804914 | A1 | * | 8/2001 | B60N 2/42763 |
| GB | 2081082 | A | | 2/1982 | |
| KR | 100292862 | B1 | * | 10/2001 | B60N 2/42772 |
| WO | 2019180213 | A1 | | 9/2019 | |
| WO | WO-2023201917 | A1 | * | 10/2023 | B60N 2/07 |

* cited by examiner

ADJUSTMENT SYSTEM FOR A VEHICLE SEAT

CROSS REFERENCE TO RELATED APPLICATIONS

The present application is a U.S. National Phase of International Application No. PCT/EP2022/055663 entitled "ADJUSTMENT SYSTEM FOR A VEHICLE SEAT," and filed on Mar. 7, 2022. International Application No. PCT/EP2022/055663 claims priority to German Patent Application No. 10 2021 202 283.9 filed on Mar. 9, 2021. The entire contents of each of the above-listed applications are hereby incorporated by reference for all purposes.

BACKGROUND

The proposed solution relates to an adjustment system for a vehicle seat.

Such an adjustment system comprises a base, a lever, which is pivotably mounted on the base, and an adjustment unit, which is coupled to the lever and is configured to pivot the lever relative to the base.

Such an adjustment system is described in US 2019/0308527 A1. The adjustment unit of a vehicle seat described therein comprises a motor by means of which a lever pivotally mounted on an upper rail of a longitudinal adjustment device serving as a base can be pivoted relative to the base so that the inclination of a seat surface can be adjusted relative to the base. A backrest of the vehicle seat is fixed relative to the seat part and is thus adjusted together therewith. The adjustment system therefore makes it possible to shift the vehicle seat from an upright seating position to a more reclined position.

WO 2019/180213 A1 describes a vehicle seat that can be pivoted from an upright seating position to a reclining position by means of a tilt drive.

Resting or reclining positions provide a high level of comfort, in particular for long journeys. However, in resting or reclining positions, depending on the inclination setting, there is potentially an increased risk of "submarining", where a seat occupant slips under the seat belt as a result of crash forces. In practice, different approaches can be taken to prevent submarining. In WO 2019/180213 A1, the vehicle seat together with the seat part and backrest part is pivoted backwards into the reclining position to such an extent that, in the event of a crash, the seat user is safely supported by the seat surface. However, this can in turn place too much stress on the seat user's spine, so WO 2019/180213 A1 suggests releasing a longitudinal displacement of the vehicle seat against an energy absorption device in the event of a crash, so that crash forces lead to lower peak loads. However, this solution cannot be used in many applications because not all vehicles have a vehicle seat that can be pivoted back far enough and because in many vehicles there is not enough space for the seat user's legs when the vehicle seat is moved longitudinally.

SUMMARY

The object underlying the proposed solution is to provide an improved adjustment system for a vehicle seat.

This object is achieved by an adjustment system with features as described herein.

Accordingly, the adjustment system comprises a release device coupled to the adjustment unit. The release device is operatively connected or connectable to a collision sensor and is arranged to cause a relative movement between the adjustment unit and the base on the basis of a signal indicating a vehicle collision from the collision sensor.

This is based on the idea that adjustment units typically used for comfort adjustments, e.g. in the form of spindle adjusters, cause relatively slow adjustment movements that are typically not fast enough in the event of a crash, but that this can be circumvented by an additional adjustment plane by means of which the adjustment unit itself is adjusted. This is because the release device provided for this purpose can, for example, be configured for a fast adjustment movement without having to pay attention to convenient adjustability.

Thus, when an imminent or already occurred crash is detected, the vehicle seat can be adjusted from a reclining position to an upright seating position sufficiently quickly to place the seat user in the safest possible seating position.

For example, the adjustment unit has a (first) component via which the adjustment unit is coupled to the lever, in particular is pivotably hinged thereto. Alternatively or additionally, the adjustment unit has a (second) component via which the adjustment unit is mounted on the base, in particular is in contact with the base.

The first component can be configured in the form of a spindle. The second component can be configured in the form of a drive. Such a spindle drive allows a particularly convenient adjustment, but other types of drive are also conceivable, so that the adjustment unit can generally have, for example, two components that can be adjusted relative to each other, in particular two components that can be adjusted relative to each other along a straight line.

Optionally, the second component is guided movably, in particular displaceably, on the base. This allows an adjustable but safe storage of the second component.

Furthermore, the second component may have an axle that is slidably guided in a slotted guide of the base. This allows for a robust design and at the same time a clearly defined guideway. By means of the release device, the axle can be moved along the slotted guide, e.g. between two end stops of the slotted guide.

The release unit can be configured to act on the second component of the adjustment unit. For example, the second component can be moved along the slotted guide by the release unit. This allows a mechanically particularly simple and robust, but at the same time efficient adjustment in the event of a crash.

The release unit may have an actuator. For example, the actuator is arranged to pivot a crank, which is pivotally mounted on the base, relative to the base. The use of a crank allows particularly fast adjustment movements, but is not absolutely necessary. Instead of an actuator with a crank, a pyrotechnic actuator can be provided. A pyrotechnic actuator enables a particularly fast release, but must be replaced after each activation. Furthermore, a pre-tensioned spring, for example, in combination with a lock release is conceivable, which represents a particularly simple solution but requires a relatively large installation space, or only a lock release, wherein the relative movement between the adjustment unit and the base occurs through the inertia of the seat user and the vehicle seat itself and is released and thus effected by the release device. In all cases, a locking mechanism can optionally be provided that locks the adjustment unit to the base after the relative movement between the adjustment unit and the base caused by the release device. In some applications, an arbitrary drive can also be provided, which, for example, enables faster adjustments than the adjustment unit, or which is activated in addition to the adjustment unit in the event of a crash.

In one embodiment, the actuator is configured in the form of a motor-gear unit. This can be self-locking or non-self-locking. A self-locking motor-gear unit additionally enables crash-proof intermediate positions, but usually requires a higher electrical power than a corresponding non-self-locking motor-gear unit.

Optionally, the release unit has a lever. This lever can be pivotably connected to the crank. In particular, a lever allows robust coupling to the adjustment unit to effect movement of the adjustment unit relative to the base.

Optionally, the lever of the release unit is pivotably connected to the axle of the second component about a pivot axis. For example, the lever is hinged to the axle. This allows for a particularly secure coupling.

It can be provided that the lever is movable between two end positions. Optionally, one arm of the crank and the lever are each lying at a dead center at both end positions relative to each other. For example, the joints of the lever and the arm of the crank lie on a straight line at both end positions. For example, the crank can be rotated 180 degrees.

The adjustment system may comprise a collision sensor arranged to detect a vehicle collision of the vehicle with the vehicle seat comprising the adjustment system and to provide a signal indicating the vehicle collision to the release device. The collision sensor can in particular be a pre-crash sensor that detects an approaching accident (shortly) before the impact and provides the signal. This enables particularly good preparation for the actual accident.

Optionally, the lever has a first arm, via which the lever is coupled to the adjustment unit, and a second arm for supporting a seat part of the vehicle seat. The arms can be of different lengths, e.g. the second arm is longer than the first arm, which allows a particularly wide adjustment even with small adjustment movements of the adjustment unit.

The first arm and the second arm may protrude at an angle to each other from a pivot axis of the lever at the base. This allows for a compact design. Alternatively, the arms are extended along a straight line. The arms are connected to each other via the pivot axis.

According to one aspect, a vehicle seat having an adjustment system according to any embodiment described herein is disclosed. For example, a seat part of the vehicle seat is supported on the base via the lever of the adjustment system. The base is e.g. fixed or connected to a vehicle floor of the vehicle via a longitudinal adjustment device.

DESCRIPTION OF THE DRAWINGS

The idea underlying the proposed solution will be explained in more detail below with reference to the exemplary embodiments shown in the figures.

DETAILED DESCRIPTION

Figure 1A:
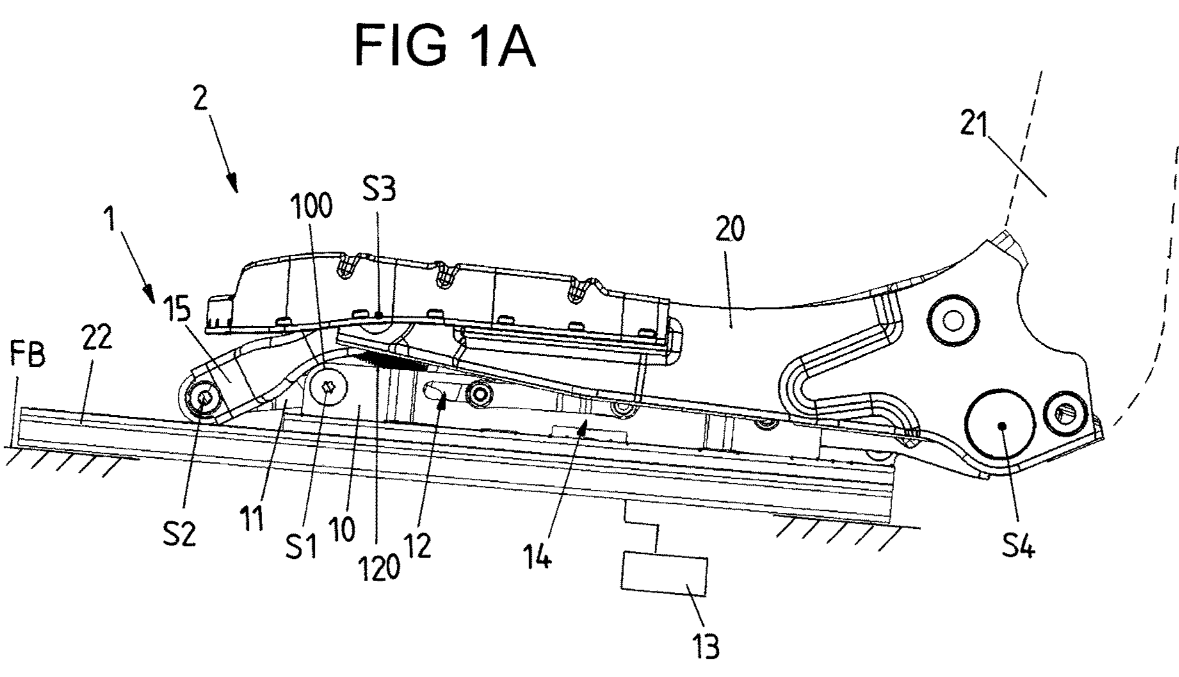
FIGS. 1A-1D show schematic views of a vehicle seat with an adjustment system in different positions.

FIG. 1A shows a vehicle seat 2 with a seat part 20 and a backrest part 21. The vehicle seat 2 is attached to a vehicle floor FB of a vehicle via a longitudinal adjustment device 22.

The longitudinal adjustment device 22 comprises a lower rail and an upper rail mounted thereon so as to be longitudinally displaceable. A base 10 is secured to the upper rail, which could alternatively be fastened directly to the vehicle floor FB.

The vehicle seat 2 further comprises an adjustment system 1 for adjusting the seat part 20 relative to the base 10. The backrest part 21 is mounted on the seat part 20. If the seat part 20 is adjusted, the backrest part 21 is also adjusted. The adjustment system 1 thus allows a rocking adjustment. The backrest part 21 can be fixed to the seat part 20 or alternatively be adjustable in inclination relative thereto via adjustment fittings.

The adjustment system 1 comprises a lever 11 pivotally mounted on the base 10 about a (first) pivot axis S1 (wherein the numbering of this and further pivot axes is for simplified reference only). The seat part 20 is supported on the base 10 via the lever 11. The adjustment system 1 comprises a connecting lever 15, which is pivotably connected to the lever 11 via a (second) pivot axis S2. The connection lever 15 is pivotably connected to the seat part 20 via a (third) pivot axis S3. The connection lever 15 connects the lever 11 to the seat part 20. Thus, the seat part 20 is connected to the base 10 via the connection lever 15 and the lever 11 and can be supported on the base 10.

The adjustment system 1 further comprises an adjustment unit 12 coupled to the lever 11. The adjustment unit is arranged to move, specifically to pivot, the lever 11 relative to the base 10. The adjustment unit 12 comprises a first component in the form of a spindle 120 and a second component in the form of a drive 121. Thus, the adjustment unit 12 is configured as a spindle drive.

FIG. 1A shows the vehicle seat in an upright seating position.

Figure 1B:
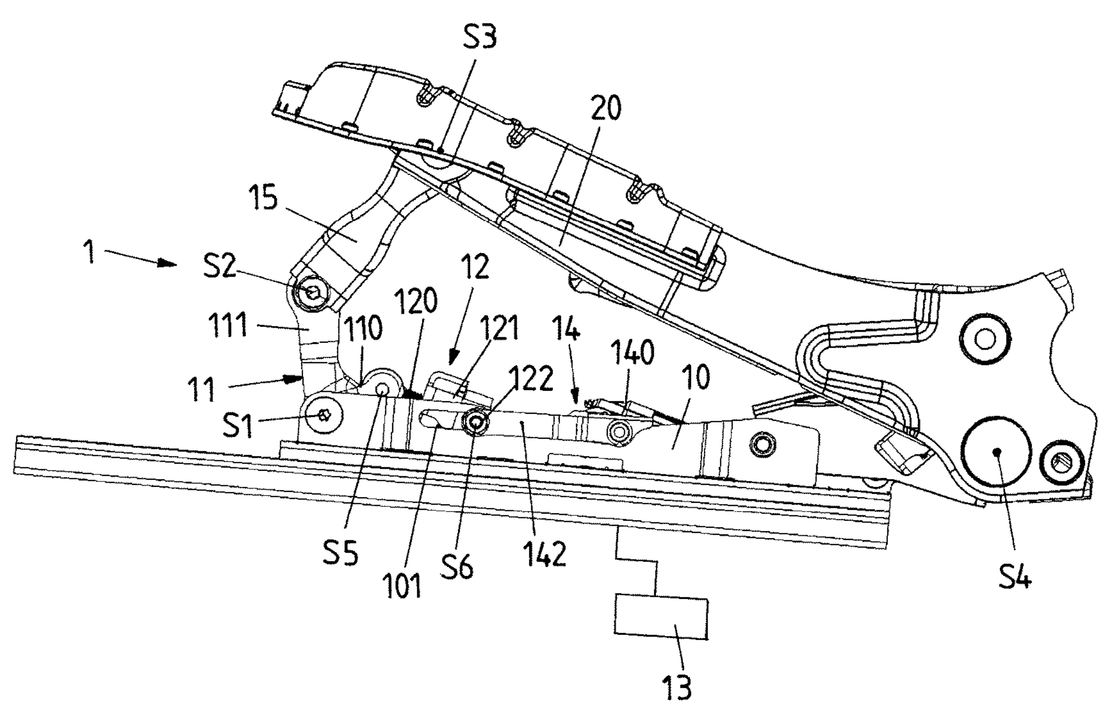

FIG. 1B shows the vehicle seat 2, wherein the seat part 20 (together with the backrest part 21 not shown in FIG. 1B) is adjusted relative to the position shown in FIG. 1A, in this case to a position inclined backwards from the viewpoint of a user sitting on the vehicle seat, e.g. a resting or reclining position. When the seat part 20 is pivoted from the upright seating position to a more rearwardly inclined position, the lever 11 is raised in relation to the base 10. In this case, the seat part 20 pivots about a rear (fourth) pivot axis S4 relative to the base 10.

As can be seen in particular from FIG. 1B, the spindle 120 is coupled to the lever 11. In the present case, the lever 11 comprises a first arm 110 and a second arm 111. The first arm extends between the first pivot axis S1 and the second pivot axis S2. The second arm 111 extends between the first pivot axis S1 and a (fifth) pivot axis S5, on which the spindle 120 is pivotably mounted on the first arm 110. The first arm 110 is shorter than the second arm 111, so even a relatively small movement of the spindle 120 can cause a relatively large adjustment of the seat part 20. In the upright sitting position (see FIG. 1A), the second arm 111 of the lever 11 and the connection lever 15 describe an acute angle. In the maximum rearwardly pivoted resting position (see FIG. 1B), the second arm 111 of the lever 11 and the connection lever 15 describe an angle, namely an obtuse angle in the example shown. The further the seat part 20 is tilted backwards, the further the angle between the second arm 111 of the lever 11 and the connection lever 15 is opened.

The drive 121 of the adjustment unit 12 comprises a housing and an axle 122. The drive 121 further comprises a spindle nut. The spindle nut is rotatably arranged relative to the axle, in this case in the housing. For example, the drive 121 comprises an electric motor. Activation of the drive 121 causes the spindle 120 to extend or retract relative to the drive 121. The axle 122 is mounted on the base 10 and, in the normal use condition shown in FIGS. 1A and 1B, is supported on the base 10 such that retraction or extension of the spindle 120 results in pivoting of the lever 11 relative to the base 10. A desired seat inclination can be set automatically and/or via a control panel (not shown) by activating the drive 121 of the adjustment unit 12 accordingly.

The adjustment unit 12 is movably mounted on the base 10. The axle 122 is slidably mounted in a slotted guide 101 of the base.

The adjustment system 1 further comprises a release device 14. The release device 14 has a non-released position and a released position. In the non-released position (see FIGS. 1A, 1B and 2A), the release device 14 rotatably locks the adjustment unit 12 to the base 10.

Figure 1C:
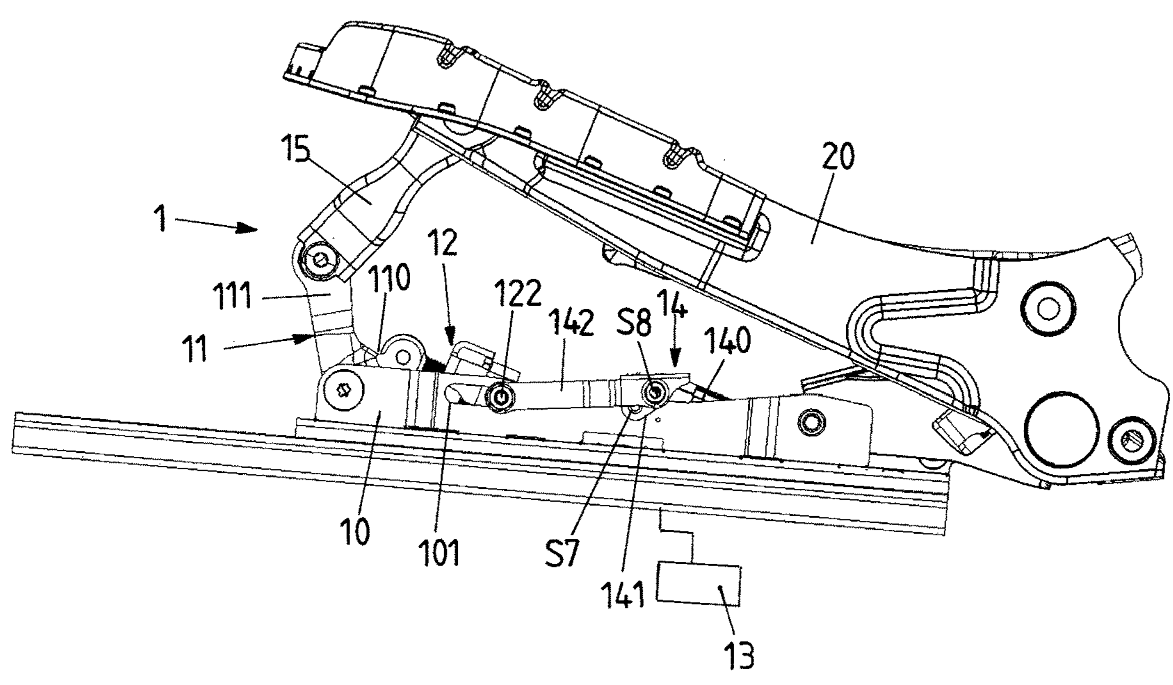
Figure 1D:
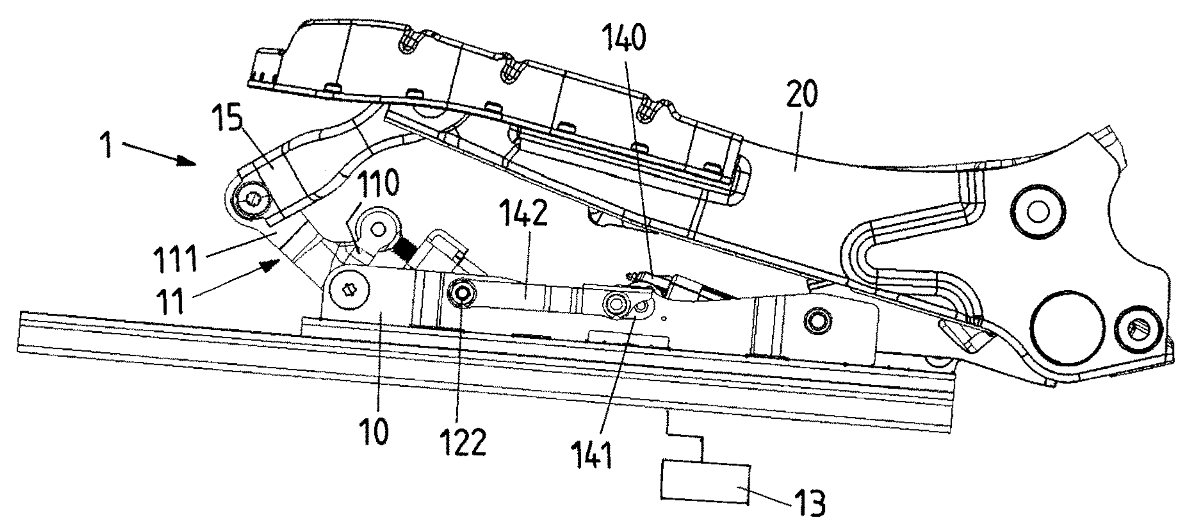
Figure 2A:
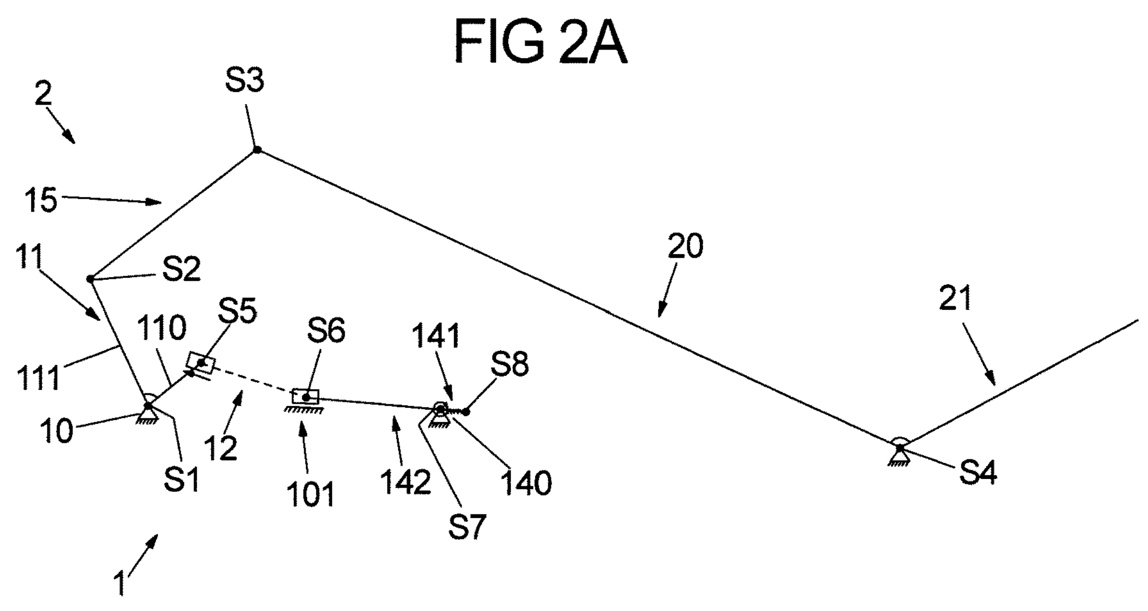
FIGS. 2A-2C show schematic diagrams of the vehicle seat in different positions.
Figure 2B:
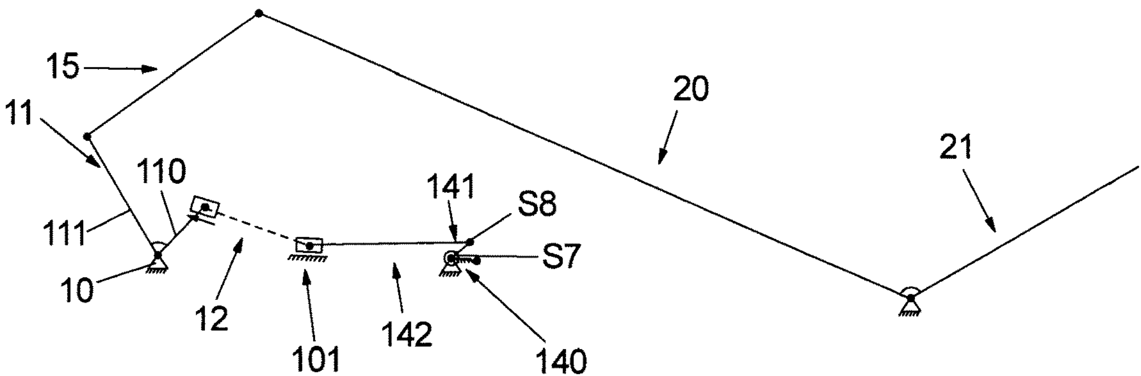
Figure 2C:
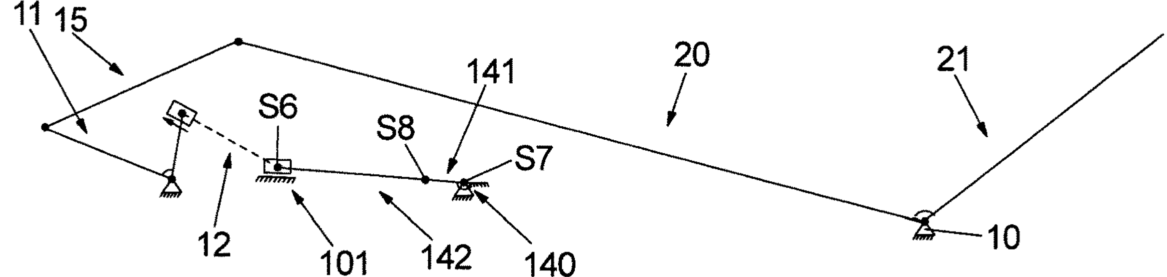

The release device 14 is mechanically coupled to the adjustment unit and is arranged to detect a signal indicating a vehicle collision and, based on the signal, to cause a relative movement between the adjustment unit 12 and the base 10, in this case starting from a rearwardly inclined position (shown in FIGS. 1B and 2A) via an intermediate position shown in FIGS. 1C and 2B into a further upright pivoted position (FIGS. 1D and 2C). In the present case, the release device 14 is configured to bring about a relative movement between the adjustment unit 12 and the base 10 on the basis of a signal indicating a vehicle collision from a collision sensor 13, which is or can be operatively connected to the release device 14. The collision sensor 13 is, for example, a distance sensor, an acceleration sensor or a combination of several sensors. The release device 14, is activated as a result of measured values from the collision sensor 13, e.g. directly actuated by it or by a control unit of the release device 14 or an external control unit. The release device 14 comprises an interface via which the signal can be applied to it and/or it can be controlled as a function of the signal.

In this case, the release device 14 comprises a release lever 142. The release lever 142 of the release device 14 is operatively connected to the lever 11 via the adjustment unit 12. A displacement of the release lever 142 causes a movement of the drive 121. In the present case, the release lever 142 is pivotably connected to the drive 121 of the adjustment unit 12 at a (sixth) pivot axis S6. In the example shown, the release lever 142 is pivotally engaged with the axle 122 of the adjustment unit 12. In the position of the release lever 142 shown in FIG. 1B, the release lever 142 secures the drive 121 of the adjustment unit 12 against a translational movement. Presently, the release lever 142 rotatably retains the axle 122 at a position of the slotted guide 101 of the base 10. In this position, the elongated release lever 142 and the elongated slotted guide 101 extend along lines parallel to each other.

In order to pivot the vehicle seat 2 from the position shown in FIGS. 1B and 2A to a more upright position, the release lever 142 is adjustable relative to the base 10. For this purpose, the adjustment system 1 comprises a motor-gear unit 140.

The motor-gear unit 140 is attached to the base 10 and coupled to a crank 141. In the present case, an output shaft of the motor-gear unit 140 is directly connected to the crank 141, e.g. in engagement. The crank 141 is mounted on a (seventh) pivot axis S7 (see in particular FIGS. 1C and 2B) on the base 10.

The release lever 142 is pivotally mounted on the crank 141 (at a free end of the crank 141) via an (eighth) pivot axis S8. The crank 141 is shorter (in this case considerably shorter) than the release lever 142. When the motor-gear unit 140 is activated, the crank 141 is pivoted about the seventh swivel axis S7. As a result, the release lever 142 is rotated about the seventh pivot axis S7 on the side of the eighth pivot axis S8, in this case raised, and displaced along the slotted guide 101 on the side of the sixth pivot axis S6. This movement takes place via the intermediate position shown in FIGS. 1C and 2B to a released end position shown in FIGS. 1D and 2C.

When the release lever 142 is displaced, the adjustment unit 12 is displaced along the slotted guide 101 (or generally along an adjustment path on the base 10), which causes the lever 11 to pivot relative to the base 10 even without activating the adjustment unit 12, see FIGS. 1D and 2C. The slotted guide 101 (or generally a guide track of the adjustment unit 12 on the base 10) is oriented substantially horizontally in the present case in normal use. In the example shown, the slotted guide 101 is aligned parallel to the adjustment axis of the longitudinal adjustment device 22.

The crank 141 can be moved from a non-actuated normal use position to an actuated crash position, in this case by a rotation of 180 degrees. Both in the non-actuated normal use position and in the actuated crash position, the sixth, seventh and eighth pivot axes S6, S7, S8 are arranged on a straight line. In this case, the seventh pivot axis S7 is arranged between the sixth and eighth pivot axes S6, S8 in the normal position of use that has not been released (see e.g. FIG. 2A). In the released crash position, the eighth pivot axis S8 is arranged between the sixth and seventh pivot axes S6, S7. Thus, the crank 141 and the release lever 142 are arranged in dead-center positions at both end positions. This can prevent incorrect release and excessive load on the motor-gear unit 140. The exemplary release lever 142 also strikes the crank 141 at both end positions. For this purpose, the release lever 142 comprises a bent section above the eighth pivot axis S8, which serves as a stop. This stop is extended beyond the eighth pivot axis S8 (i.e. the pivot axis of the release lever 142 with the crank 141). In this way, both end positions are clearly defined. The stop of the release lever 142 strikes a stop on the crank 141 (e.g. a stop attached thereto) at the end positions. At both end positions, the stop of the release lever 142 strikes opposite sides of the crank 141.

In the event of an accident, particularly in a pre-crash case, the motor-gear unit 140 drives a rotation and moves the crank 141 from the rear dead-center position. From this point, a traction force in the spindle 120 caused by the seat and occupant weight ensures movement of the crank 141 and release lever 142 to the forward end position without requiring a high torque from the motor. The traction force causes a movement of the attachment point of the adjustment unit 12 on the guideway (in this case the slotted guide 101), which lowers the seat inclination (of the seat surface). With this movement, the release lever 142 is also pulled forwards and allows the crank 141 to rotate 180° to the front end position.

An uncontrolled return from the forward position is prevented by the applied torque of the motor-gear unit 140, the dead forward position of the release lever 142 and crank 141, and the stop on the release lever 142. To return the release device 14 to the non-released initial position, the drive 121 and the motor-gear unit 140 are moved simultaneously. In doing so, the spindle 120 moves the kinematics of the seat tilt against a stop in the lower position. Once this is reached, the adjustment unit 12 pushes the entire mechanism back to its non-released initial position, preventing high torque on the motor-gear unit 140. The mechanism therefore only has self-locking at the end positions due to the kinematic positions. Therefore, during movement, a high adjustment speed can be efficiently achieved with high gear efficiencies. This makes it possible to use a relatively small motor. Furthermore, since the release lever 142 lies flat against the base 10 in the non-released position (and/or substantially parallel to the adjustment axis of the longitudinal adjustment device 22 and/or to the slotted guide 101), only a very small installation space is required.

By means of the motor-gear unit 140, the vehicle seat 2 can thus be transferred from a rearwardly inclined position to a more upright position in a particularly short time. This bypasses the comparatively slow spindle drive. The release device 14 shifts the attachment point, in particular the pivot point of the spindle 120 relative to the base 10. Specifically, the release device 14 exerts a pressure on this point and subsequently pushes it forward, in the slotted guide 101.

As already mentioned, the inclination of the seat part 20 is mechanically coupled to the inclination of the backrest part 21, in particular fixed relative thereto. Alternatively, however, it is also conceivable to design the seat part 20 to be adjustable in inclination independently of the backrest part 21, e.g. by mounting the backrest part 21 on the base 10.

Optionally, the adjustment unit 12 is preloaded by means of a spring to assist the adjustment of the seat inclination. For example, the spring pulls the seat part 20 towards the base 10. It should also be mentioned that it is conceivable to replace the motor-gear unit 140 with a pyrotechnic actuator or a spring with a locking mechanism at the end positions.

The motor-gear unit 140 can optionally be self-locking. In this way, even intermediate positions can be crash-proof.

In order to detect an accident, the adjustment system 1 comprises the already mentioned collision sensor 13. This is configured, for example, as a pre-crash sensor. In the event of a crash, the collision sensor 13 provides a signal, which is provided to the release device 14. This signal activates the release device 14. Thus, in the event of an accident, the vehicle seat 2 can be quickly raised so that a seat user sitting on the vehicle seat 2 can be brought into a safe sitting position in good time.

LIST OF REFERENCE NUMERALS

1 Adjustment system
10 Base
100 Bearing point
101 Slotted guide
11 Lever
110 First arm
111 Second arm
12 Adjustment unit
120 Spindle (first component)
121 Drive (second component)
122 Axle
13 Collision sensor
14 Release device
140 Motor-gear unit (actuator)
141 Crank
142 Release lever
15 Connection lever
2 Vehicle seat
20 Seat part
21 Backrest part
22 Longitudinal adjustment device
FB Vehicle floor
S1-S8 Pivot axis

The invention claimed is:

1. An adjustment system for a vehicle seat, comprising
a base,
a lever, which is pivotably mounted on the base,
an adjustment unit, which is coupled to the lever and is configured to pivot the lever relative to the base, wherein the adjustment unit comprises a first component, via which the adjustment unit is coupled to the lever, and a second component, via which the adjustment unit is mounted on the base, wherein the second component comprises an axle which is displaceably guided in a slotted guide of the base, and
a release device coupled to the adjustment unit, which release device is configured to cause a relative movement between the adjustment unit and the base on the basis of a signal indicating a vehicle collision from a collision sensor operatively connected or connectable to the release device.

2. The adjustment system according to claim 1, wherein the first component is configured in the form of a spindle and the second component is in the form of a drive coupled to the spindle.

3. The adjustment system according to claim 1, wherein the second component is displaceably guided on the base.

4. The adjustment system according to claim 1, wherein the release unit is configured to act on the second component of the adjustment unit.

5. The adjustment system according to claim 1, wherein the release unit comprises an actuator which is configured to pivot a crank pivotally mounted on the base relative to the base.

6. The adjustment system according to claim 5, wherein the actuator is configured in the form of a motor-gear unit.

7. The adjustment system according to claim 5, wherein the release unit comprises a release lever which is pivotably connected to the crank.

8. The adjustment system according to claim 1, wherein the release unit comprises an actuator which is configured to pivot a crank pivotally mounted on the base relative to the base, wherein the release unit comprises a release lever which is pivotably connected to the crank and the release lever of the release unit is connected to the axle of the second component such that it can pivot about a pivot axis.

9. The adjustment system according to claim 7, wherein the release lever is movable between two end positions, wherein one arm of the crank and the release lever are each lying at a dead center in both end positions relative to each other.

10. The adjustment according to claim 1, further comprising a collision sensor, which is configured to detect a vehicle collision and to provide a signal indicating the vehicle collision to the release device.

11. The adjustment system according to claim 1, wherein the lever comprises a first arm, via which the lever is coupled to the adjustment unit, and a second arm for supporting a seat part of the vehicle seat.

12. The adjustment system according to claim 11, wherein the first arm and the second arm project at an angle to each other from a pivot axis of the lever.

13. A vehicle seat having a seat part and an adjustment system according to claim 1, wherein the seat part is supported on the base via the lever of the adjustment system.

14. An adjustment system for a vehicle seat, comprising,
a base,
a lever, which is pivotably mounted on the base,
an adjustment unit, which is coupled to the lever and is configured to pivot the lever relative to the base, wherein the adjustment unit comprises a first component, via which the adjustment unit is coupled to the lever, and a second component, via which the adjustment unit is mounted on the base, and
a release device coupled to the adjustment unit, which release device is configured to cause a relative movement between the adjustment unit and the base on the basis of a signal indicating a vehicle collision from a collision sensor operatively connected or connectable to the release device, wherein the release unit is configured to act on the second component of the adjustment unit.

15. A vehicle seat having a seat part and an adjustment system according to claim 14, wherein the seat part is supported on the base via the lever of the adjustment system.

* * * * *